US006414047B1

(12) United States Patent
Abe

(10) Patent No.: US 6,414,047 B1
(45) Date of Patent: Jul. 2, 2002

(54) POLYOLEFIN FOAM AND POLYOLEFIN RESIN COMPOSITION

(75) Inventor: Shigehiko Abe, Mie (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 09/942,752

(22) Filed: Aug. 31, 2001

(30) Foreign Application Priority Data

Sep. 4, 2000 (JP) ........................................ 2000-271507

(51) Int. Cl.⁷ .................................................. C08J 9/00
(52) U.S. Cl. ........................................ 521/142; 521/143
(58) Field of Search ................................. 521/142, 143

(56) References Cited

FOREIGN PATENT DOCUMENTS

| JP | 6-128403 | 5/1994 |
| JP | 9-506912 | 7/1997 |
| JP | 10-101854 | 4/1998 |
| JP | 2000-225638 | 8/2000 |
| JP | 2001-2816 | 1/2001 |

*Primary Examiner*—Morton Foelak
(74) *Attorney, Agent, or Firm*—Oblon, Spivak, McClelland, Maier & Neustadt, P.C.

(57) ABSTRACT

A high-expanded crosslinked foam having excellent flexibility, toughness, heat resistance and compressibility, a smooth surface and uniform cells, and a polyolefin resin composition to be used therefore are provided. A polyolefin-based crosslinked foam has the following characteristics (a) to (c) and is obtained by the crosslinked foaming of a foaming polyolefin resin composition comprising a polyolefin resin composition and a foaming agent:

(a) Gel fraction is from 10% to 90%;
(b) Degree of swelling is 30 or less; and
(c) When glass transition point determined from the temperature dependence of dynamic viscoelasticity is represented by the peak of tan δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) ($\alpha = \log E'_0/E'_{100}$) is from 10 to 30.

37 Claims, No Drawings

POLYOLEFIN FOAM AND POLYOLEFIN RESIN COMPOSITION

FIELD OF THE INVENTION

The present invention relates to a polyolefin-based crosslinked foam and a polyolefin resin composition to be used therefor. More particularly, the present invention relates to a polyolefin-based crosslinked foam usable in automobile interior, building heat insulating material, industrial material and furniture. Even more particularly, the present invention relates to a high-expanded crosslinked foam having excellent flexibility, toughness, heat resistance and compressibility, a smooth surface and uniform cells.

BACKGROUND OF THE INVENTION

A polyethylene-based crosslinked foam is excellent in flexibility, lightness, heat insulation, sound insulation, etc., and is worked in products having various shapes which are used widely used in arts such as building heat insulation, cushion, automobile interior, packaging material and bath mat.

As methods for the preparation of crosslinked foam product of polyolefin resin there have heretofore been known various methods. For example, a block foam comprising a polyethylene resin is prepared by kneading a polyethylene with a peroxide and a decomposable foaming agent under the conditions that the two components cannot be decomposed to prepare a crosslinkable foamable resin composition, and then subjecting the crosslinkable foamable resin composition to (a) one-shot press-molding method which comprises packing the crosslinkable foamable resin composition in a mold in a press, heating the crosslinkable foamable resin composition under pressure, and then removing the pressure to produce a foam or (b) two-shot press-molding method consisting of a first step which comprises heating the crosslinkable foamable resin composition in a sealed mold under pressure to cause the foaming agent to be partially decomposed, and then removing the pressure to obtain an intermediate foam and a second step which comprises heating the intermediate foam at atmospheric pressure to cause the residual foaming agent to be decomposed. In accordance with the former one-shot press-molding method, the polymer expands momentarily when pressure is removed and thus can be easily deformed. Thus, the one-shot press-molding method is used to form a foam having an expansion ratio of about 10. On the other hand, the two-shot press-molding method requires a longer production cycle and hence a higher production cost than the one-shot press-molding method but is advantageous in that a high-expanded foam having an expansion ratio of about 30 can be obtained.

Also are known a method which comprises mixing a polyolefin resin with a thermally decomposable foaming agent, forming the mixture into a sheet, and then irradiating the sheet with ionizing radiations so that it is crosslinked and heated to cause crosslinked foaming and a method which comprises mixing a polyolefin resin with a thermally decomposable foaming agent and an organic peroxide having a lower decomposition temperature than the foaming agent, forming the mixture into a sheet, heating the sheet so that the organic peroxide is decomposed and crosslinked, and then allowing the foaming agent to be decomposed to cause crosslinked foaming. The polyolefin-based foam prepared by the foregoing method is excellent in flexibility and heat insulation and thus can be used as various cushioning materials or heat insulating materials. As the polyolefin resin to be used in these foaming methods there is mainly used a low density polyethylene which can be easily predetermined in gel fraction and foaming conditions (hereinafter referred to as "LDPE") prepared by a high pressure radical polymerization process. However, conventional LDPE has a wide distribution of molecular weight, making it difficult to invariably produce a crosslinked foam having a constant quality. Further, the resulting foam has too low a strength to freely control its rigidity.

On the other hand, in order to facilitate the control of degree of crosslinking and hence obtain a foam having improved toughness and flexibility, a method has been practiced involving the blending of LDPE with ethylene-α-olefin copolymer (hereinafter referred to as "LLDPE").

Further, JP-A-7-188442 (The term "JP-A" as used herein means an "unexamined published Japanese patent application") proposes the use of LLDPE, as a foam, having α-olefin uniformly present as a copolymerizing component in molecular chain and having a narrow distribution of molecular weight obtained in the presence of a metallocene compound as a polymerization catalyst.

However, the crosslinked foam prepared using LDPE is disadvantageous in that it not only exhibits low break strength but also cannot be freely predetermined in its flexibility.

The crosslinked foaming with LLDPE for the purpose of providing the foam with higher toughness and flexibility is disadvantageous in that it has too high a gel fraction to effect two-shot press molding, causing troubles in working and hence providing only a foam having a low expansion ration. This foaming method is also disadvantageous in that the range of foaming is very narrow, causing troubles in working.

The method involving blending of LDPE with LLDPE makes it possible to improve the controllability of degree of crosslinking and toughness and flexibility, but the improving effect is not satisfactory because this method requires that the added amount of LDPE be not smaller than 50%.

The method proposed in JP-A-7-188442 is disadvantageous in that the gel fraction, which is a problem with LLDPE obtained in the presence of conventional Ziegler catalyst, is too high, giving a low foaming ratio that makes it impossible to solve the problems that two-shot press-molding indispensable for high ratio molding cannot be effected and the range of foaming is thus very narrow.

SUMMARY OF THE INVENTION

Accordingly, it is an object of the present invention to overcome these problems, i.e., provide a crosslinked foam excellent in rigidity, heat resistance, etc., which can be used in the art such as building material and automobile interior.

As a result of extensive studies to overcome the above problems, it has been found that a foam having specific properties exhibits high flexibility, toughness, dimensional stability, heat resistance, compressibility and expansion ratio and has a smooth surface and uniform cells in addition to the excellent properties of conventional polyethylene-based crosslinked foam and thus can provide a polyolefin-based crosslinked foam which can be used for automobile interior or as building material requiring heat resistance and rigidity.

The polyolefin-based crosslinked foam according to the invention is a polyolefin-based crosslinked foam having the following characteristics (a) to (c) obtained by the crosslinked foaming of a foaming resin composition comprising a polyolefin resin and a foaming agent:

(a) Gel fraction represented by the residue obtained by extracting with p-xylene at 120° C. for 24 hours, and then immediately drying at 80° C. and 10 mmHg for 24 hours is from 10% to 90%;

(b) Degree of swelling represented by the following equation (1) is 30 or less:

$$\text{Degree of Swelling} = \frac{\text{Residue (g) shortly after 24 hours of Extraction with p-xylene at 120° C.}}{\text{Residue (g) obtained by extracting with p-xylene at 120° C. for 24 hours, and then immediately drying at 80° C. and 10 mmHg for 24 hours}} \quad (1)$$

and;

(c) When glass transition point determined from the temperature dependence of dynamic viscoelasticity is represented by the peak of δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) (α=log $E'_0/E'_{100}$) is from 10 to 30.

It has also been found that the desired foam can be obtained by using a polyolefin resin composition comprising 100 parts by weight of a polyolefin resin and from 5 to 50 parts by weight of a low molecular polyolefin wax, particularly a polyolefin resin composition comprising 100 parts by weight of a polyolefin resin having a density of from 0.860 to 0.970 g/cm³ and a weight average molecular weight of 60,000 or more as determined by gel permeation chromatography and from 5 to 50 parts by weight of a low molecular polyolefin wax having a viscosity average molecular weight of from 1,500 to 10,000 as determined by a viscosity method and a melting point of from 100° C. to 160° C. as determined by DSC method. Thus, the present invention has been completed.

DETAILED DESCRIPTION OF THE INVENTION

The present invention will be described in detail below.

The foam of the invention is a polyolefin-based crosslinked foam obtained by the crosslinked foaming of a foaming resin composition comprising a polyolefin resin composition and a foaming agent, wherein the gel fraction represented by the residue obtained by extracting with p-xylene at 120° C. for 24 hours, and then immediately drying at 80° C. and 10 mmHg for 24 hours is from 10% to 90%, preferably from 15% to 70%, the degree of swelling represented by the equation (1) is 30 or less, preferably from 15 to 30, and when the glass transition point determined from the temperature dependence of dynamic viscoelasticity is represented by the peak of tan δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) (α=log $E'_0/E'_{100}$) is from 10 to 30, preferably from 10 to 20. When the gel fraction falls below 10%, gas escapes from the resin during foaming, making it impossible to form a foam. On the contrary, when the gel fraction exceeds 90%, the growth of cells is inhibited, not only making it impossible to form a highly foam but also causing the surface of the foam to be cracked. When the degree of swelling represented by the equation (1) exceeds 30, the resulting foam exhibits a great dimensional change and a great dispersion of diameter of cells. Further, the resulting foam exhibits a deteriorated strength to disadvantage. When the glass transition point determined from the temperature dependence of dynamic viscoelasticity is represented by the peak of tan δ determined by the measurement of dynamic viscoelasticity at a frequency of 10 Hz, if there are observed two or more peaks, there are glass transition points corresponding to these peaks, making it possible to obtain only a foam having a small strength. When the ratio α of storage modulus at 0° C. ($E'_0$) to storage modulus at 100° C. ($E'_{100}$) (α=log $E'_0/E'_{100}$) does not fall within the range of from 10 to 30, the resulting foam is disadvantageous in dimensional change and heat resistance.

The polyolefin resin composition to be used in the present invention to obtain the foam includes a polyolefin resin composition comprising 100 parts by weight of a polyolefin resin and from 5 to 50 parts by weight of a low molecular polyolefin wax, particularly 100 parts by weight of a polyolefin resin having a density of from 0.860 to 0.970 g/cm³ and a weight average molecular weight of 60,000 or more as determined by gel permeation chromatography and from 5 to 50 parts by weight of a low molecular polyolefin wax having a viscosity average molecular weight of from 1,500 to 10,000 as determined by a viscosity method and a melting point of from 100° C. to 160° C. as determined by DSC method.

The polyolefin resin to be used in the invention is preferably a polyolefin resin having a density of from 0.860 to 0.970 g/cm³, preferably from 0.860 to 0.945 g/cm³ and a weight average molecular weight of 60,000 or more as determined by gel permeation chromatography. Any polyolefin resin which falls within the above defined range may be used. When the density of the polyolefin resin falls below 0.860 g/cm³, the resulting foam becomes sticky to disadvantage. On the contrary, if the density of the polyolefin resin exceeds 0.970 g/cm³, the polyolefin resin begins to decompose when kneaded with the peroxide and foaming agent, making it impossible to prepare a uniform unfoamed compound. When the weight average molecular weight of the polyolefin resin falls below 60,000, it is necessary to increase the amount of the peroxide to be added during the formation of foam or the dose of ionizing radiation. This deteriorates the productivity of foam to disadvantage.

Examples of the polyolefin resin to be used in the invention include polyethylene resins such as high density polyethylene (hereinafter referred to as "HDPE") and LLDPE. In the invention, LLDPE, which is an ethylene-α-olefin copolymer, is preferred because it can form a foam having uniform cells excellent in flexibility and toughness, particularly excellent in crosslinkability and foamability, when subjected to foaming.

In the case where the polyolefin resin to be used in the invention is LLDPE, LLDPE may be prepared by any of high pressure process, solution process and gas phase process. The preparation of LLDPE can be normally effected by the copolymerization of ethylene with α-olefin in the presence of a catalyst such as Ziegler catalyst made of a solid catalyst component containing magnesium and titanium and an organic aluminum compound, metallocene catalyst made of an organic transition metal compound containing a cyclopentadienyl derivative and a compound which reacts with the organic transition metal to produce an ionic complex and/or organic metal compound and vanadium catalyst. Examples of the α-olefin employable herein include propylene, butene-1, hexene-1, octene-1, and 4-methylpentene-1. Preferred among these LLDPE's is LLDPE comprising a $C_3$–$C_{12}$ α-olefin as α-olefin because it can provide a foam particularly excellent in uniformity of cells, flexibility and toughness.

The above polyolefin resin to be used in the invention has MFR of from 0.1 to 30 g/10 min, preferably from 2 to 15 g/10 min, at a temperature of 190° C. and a load of 2,160 g, a melt tension of from 50 to 300 mN, preferably from 50 to 150 mN as determined when stretched at a draw ratio of 50 using a capillary rheometer having a die size L/D of 8/2.095 (mm) and a cylinder temperature of 160° C. and a non-linear parameter of 2 or more as an index of strain hardenability of stretch viscosity. When MFR of the polyolefin resin falls below 0.1 g/10 min, the resulting polyolefin resin generates much heat due to shearing when kneaded with the foaming agent, causing the foaming agent to begin decomposition and hence making it impossible to obtain good cells. On the contrary, when MFR of the polyolefin resin exceeds 30 g/10 min, the resulting polyolefin resin exhibits a good miscibility but may be deteriorated in mechanical properties such as tensile strength and elongation. When the melt tension of the polyolefin resin is from 50 to 300 mN as determined when stretched at a draw ratio of 50 using a capillary rheometer having a die size L/D of 8/2.095 (mm) and a cylinder temperature of 160° C., the polyolefin resin can difficulty catch air during melt kneading, providing uniform cells when subjected to crosslinked foaming. The polyolefin resin of the invention has a non-linear parameter ($\lambda$) of 2 or more, preferably 3 or more as an index of strain hardening of extensional viscosity. When the non-linear parameter ($\lambda$) falls within this range, the resulting foam has cells having uniform diameters. When the non-linear parameter falls below 2, the strain hardening of stretch viscosity or melt tension runs short. In particular, the expansion ratio is less raised at the second forming stage in the two-shot press-molding method. The non-linear parameter is determined as follows.

The value of extensional viscosity (calculated) in a linear range at the time tm at which the extensional viscosity reaches maximum value is defined to be $\eta 1$ (tm). The value obtained by dividing the measured maximum value $\eta e$ (tm) of extensional viscosity by $\eta 1$ (tm) is defined to be non-linear parameter ($\lambda$) as an index of strain hardening of extensional viscosity. The extensional viscosity in linear range can be calculated from dynamic elastic modulus separately measured using Ozaki's equation (Ozaki et al., "Journal of The Society of Rheology, Japan", 16, page 53 (1988)). It is known that a straight-chain polyethylene such as LLDPE and HDPE is excellent in dynamic properties such as tensile strength as compared with LDPE having long-chain branches but has ununiform section and poor forming stability when subjected to forming such as blow molding, vacuum molding and inflation molding. These problems with forming are mostly attributed to extensional viscosity (or melt tension). It is thus known that when the strain hardening of extensional viscosity is sufficiently great (when the melt tension is sufficiently great), the formability is improved.

Cells grow at a considerably great rate when the polyolefin resin is subjected to foaming. Thus, it is thought that the strain hardening of extensional viscosity has a great effect on the foamability. As methods for enhancing the strain hardening (or melt tension) of extensional viscosity there are known a method involving the crosslinking by blending of LDPE or with a peroxide, a method involving the introduction of ultrahigh molecular component, a method involving the introduction of long-chain branches, etc. However, the blending of LDPE is disadvantageous in that LDPE needs to be used in an amount of about 30% by weight to enhance the strain hardening (or melt tension) of extensional viscosity, unavoidably causing the deterioration of dynamic properties.

The density of the polyolefin resin of the invention is determined according to JIS K7676. The weight-average molecular weight as used herein is a value obtained by measuring using gel permeation chromatography with 1,2,4-trichlorobenzene, and then calculating in terms of straight-chain polyethylene.

The low molecular polyolefin wax to be used in the invention can be any low molecular polyolefin wax having a viscosity average molecular weight of from 1,500 to 10,000, preferably from 3,000 to 7,000, as determined by a viscosity method, and a melting point of from 100° C. to 160° C., preferably from 110° C. to 130° C., as determined by DSC method. When the viscosity average molecular weight of the low molecular polyolefin wax falls below 1,500, the low molecular polyolefin wax migrates to the surface of the resulting foam to render the foam sticky. On the contrary, when the viscosity average molecular weight of the low molecular polyolefin wax exceeds 10,000, the crosslinking product of the resulting polyolefin resin composition has too high a gel fraction to provide a foam at a high expansion ratio to disadvantage. When the melting point of the low molecular polyolefin wax falls below 100° C., the foam formed of the resulting polyolefin resin composition has an insufficient heat resistance to disadvantage. On the contrary, when the melting point of the low molecular polyolefin wax exceeds 160° C., the polyolefin resin composition can hardly have a low molecular polyolefin wax uniformly dispersed therein. When such a composition is subjected to foaming, the resulting foam has rough cells, making it impossible to obtain a foam having a high expansion ratio.

Examples of the low molecular polyolefin wax to be used in the invention include those obtained by the homopolymerization or copolymerization of olefins, such as ethylene, propylene, butene-1, hexene-1, octene-1 and 4-methyl-pentene-1, in the presence of a catalyst such as Ziegler catalyst. Particularly preferred among these low molecular waxes is low molecular polyethylene wax because it can form a polyolefin resin composition from which a foam excellent in uniformity of cells, flexibility and toughness, particularly in crosslinkability and foamability.

The viscosity average molecular weight of the low molecular polyolefin wax of the invention is determined by measuring the intrinsic viscosity of the low molecular polyolefin wax in a 130° C. tetralin solution, and then substituting the measurements in the following equation (2) for viscosity average molecular weight.

$$[\eta]=4.60\times10^{-1}\times M^{0.725} \qquad (2)$$

wherein [$\eta$] represents the intrinsic viscosity of the low molecular polyolefin wax; and M represents the viscosity average molecular weight.

The melting point as used herein is determined according to JIS K7121 using DSC.

The polyolefin resin composition of the invention comprises a low molecular polyolefin wax in an amount of from 5 to 50 parts by weight, preferably from10to 30 parts by weight, based on 100 parts by weight of polyolefin resin. When the amount of the low molecular polyolefin wax to be incorporated in the polyolefin resin falls below 5 parts by weight, the resulting polyolefin resin composition can less afford to be formed when subjected to foaming, exerting little improvement effect. On the contrary, when the amount of the low molecular polyolefin wax to be incorporated in the polyolefin resin exceeds 50 parts by weight, the resulting polyolefin resin composition exhibits deteriorated break strength and elongation when subjected to foaming.

The polyolefin resin composition of the invention is adapted for foaming and thus can be subjected to various known foaming methods to form a foam excellent in uniformity of cells, flexibility and toughness. Such a foam is preferably prepared at an expansion ratio of not smaller than 2.

Examples of the method for crosslinked forming of the polyolefin resin composition of the invention include a peroxide crosslinked forming method which comprises mixing a polyolefin resin composition with a thermally decomposable foaming agent and an organic peroxide, forming the mixture, heating the mixture so that the organic peroxide is decomposed and crosslinked, and then allowing the thermally decomposable foaming agent to be decomposed to cause crosslinked foaming, and an ionizing radiation crosslinked foaming method which comprises mixing a polyolefin resin composition with a thermally decomposable foaming agent, forming the mixture, and then irradiating the mixture with ionizing radiation so that it is crosslinked and heated to cause crosslinked foaming.

Referring further to the peroxide crosslinked foaming method, to the polyolefin resin composition of the invention are added a thermally decomposable foaming agent, an organic peroxide as a crosslinking agent, and optionally a foaming aid, a filler, a pigment, etc. The mixture is then kneaded at a temperature where the thermally decomposable foaming agent and the organic peroxide cannot be decomposed, e.g., 125° C. to 135° C., over a heated mixing roll, kneader, extruder, etc. Subsequently, the resulting composition is packed in a mold. The composition is then heated to a temperature of from 140° C., to 170° C. under pressure for a predetermined period of time so that the thermally decomposable foaming agent and the organic peroxide are fully decomposed. The pressure is then removed to obtain a foam.

As the organic peroxide there may be used a hydroperoxide, dialkyl peroxide, peroxyester or the like. Preferred among these organic peroxides is one having a decomposition temperature of higher than 90° C. at which a 1-minute half-life is given. Examples of such an organic peroxides include dicumyl peroxide, t-butyl hydroperoxide, 1,3-bis(t-butylperoxyisopropyl)benzene, di-t-butyl peroxide, 2,5-di (t-butylperoxy)hexane, t-butylperoxy benzoate, 2,5-dimethyl-2,5-di(t-butylperoxy)hexyne, 2,5-dimethyl-2,5-di(t-butylperoxy)hexane, and di-t-butylperoxy phthalate. The added amount of such an organic peroxide is preferably from 0.1 to 3.0 parts by weight based on 100 parts by weight of the polyolefin resin.

Referring further to the ionizing radiation crosslinked foaming method, to the polyolefin resin composition are added a thermally decomposable foaming agent, and optionally a foaming aid, a filler, and a pigment. The mixture is then melt-kneaded at a temperature lower than the decomposition temperature of the thermally decomposable foaming agent, e.g., 165° C. to 180° C. using a general-purpose kneading apparatus such as single-screw extruder, twin-screw extruder, Banbury mixer, kneader mixer and roll so that it is formed intoa foamable sheet. The foamable sheet thus obtained is then irradiated with ionizing radiations so that the polyolefin resin constituting the foamable sheet is crosslinked. As the ionizing radiations there may be used high energy radiations (high voltage and high transmission) which have been heretofore used in the crosslinking of synthetic resin, such as electron ray, X-ray, β-ray and γ-ray. The dose of radiations is normally adjusted to a range of from 1 to 20 Mrad so that the crosslinking degree (gel fraction) reaches 10 to 90% by weight. The foamable sheet comprising a crosslinked polyolefin resin can be heated to a temperature of not lower than the melting point of the resin, preferably not lower than 190° C., to form a crosslinked foamed sheet. As the foaming method there may be used a known ordinary method, e.g., heat foaming method using a hot air, infrared rays, metal bath, oil bath, etc.

The thermally decomposable foaming agent employable herein is not specifically limited so far as it causes the polyolefin resin to decompose and produce gas during heat melting. An ordinary organic or inorganic chemical foaming agent may be used. Examples of the organic or inorganic chemical foaming agent employable herein include azo compounds such as azodicarbonamide, 2,2'-azobisisobutyronitrile, azohexahydrobenzonitrile and diazoaminobenzene, sulfonyl hydrazide compounds such as benzenesulfonyl hydrazide, benzene-1,3-sulfonyl hydrazide, diphenylsulfon-3,3'-disulonyl hydrazide, diphenyloxide-4,4'-disulfonyl hydrazide, 4,4'-oxybis (benzenesulfonylhydrazide) and paratoluenesulfonyl hydrazide, nitroso compounds such as N,N'-dinitropentamethylenetetramine and N,N'-dinitroso-N,N'-dimethylphthalamide, azide compounds such as terephthalazide and p-t-butylbenzazide, and inorganic compounds such as sodium bicarbonate and ammonium carbonate. At least one of these compounds may be used. Preferred among these compounds are azodicarbonamide and 4,4'-oxybis (benzenesulfonylhydrazide). The added amount of such a thermally decomposable foaming agent is preferably from 2 to 30 parts by weight based on 100 parts by weight of the polyolefin resin.

For the purpose of lowering the decomposition temperature of the thermally decomposable foaming agent, a foaming accelerator or foaming aid maybe used. Examples of the foaming accelerator or foaming aid employable herein include inorganic salts such as zinc white, zinc nitrate, zinc phthalate, zinc carbonate, phosphorus trichloride and tribasic lead sulfate, metal soap such as zinc aliphatic acid soap, lead aliphatic acid soap and cadmium aliphatic acid soap, acids such as boric acid, oxalic acid, succinic acid and adipic acid, urea, ethanolamine, glucose, and glycerin.

On the other hand, for the purpose of raising the decomposition temperature of the thermally decomposable foaming agent, a foaming inhibitor may be used. Examples of the foaming inhibitor employable herein include organic acids such as maleic acid, fumaric acid, phthalic acid, maleic anhydride and phthalic anhydride, halogenated organic acids such as stearoyl chloride and phthaloyl chloride, polyvalent alcohols such as hydroquinone, aliphatic acid amine, amide, oxim, organic sulfur-containing compounds such as isocyanate, phosphate such as chloride of phosphorous acid, tin compounds such as dibutyl tin malate, tin chloride and tin sulfate, and hexachloropentadiene.

The polyolefin resin composition of the invention may comprise other arbitrary components incorporated therein so far as the effect of the invention cannot be impaired. Examples of the arbitrary component to be incorporated in the polyolefin resin composition include ethylene copolymer rubber such as ethylene-propylene copolymer rubber, ethylene-propylene-diene copolymer rubber and ethylene-butene copolymer rubber, styrene-butadiene rubber, styrene-butadiene block, and hydrogenation product thereof.

The inorganic filler to be incorporated in the polyolefin resin composition can use a filler such as talc, calcium carbonate, clay, mica, barium sulfate and magnesium hydroxide, fire retardant, electrically-conductive filler such as carbon black and metallic fiber, or any of various pigments. The maximum packing of such a filler in the crosslinked foam comprising LDPE, which has heretofore been used, is 100 parts based on 100 parts of the resin. The use of the polyolefin resin composition of the invention makes it possible to raise the maximum packing of filler to 150 parts.

The foaming polyolefin resin composition of the invention can be then subjected to ordinary crosslinked foaming method to form various foams such as sheet-like and board-like materials which can be used as flooring, automobile interior, various cushioning material, pipe, wire cover, panel, etc.

The present invention will be described in more detail by reference to the following examples, but the present invention should not be construed as being limited thereto.

The various measuring methods conducted in the examples and comparative examples are described below.

Gel Fraction and Degree of Swelling of Crosslinked Foam

The crosslinked foam was cut. 0.5 g of the crosslinked foam was measured out. The material was kept in 50 ml of 120° C. p-xylene for 24 hours, and then passed through a 200-mesh metal gauze. The resulting residue was then dried at a temperature of 80° C. and 10 mmHg for 24 hours. The residue of extraction after drying under reduced pressure was then calculated by weight percentage. In order to determine the degree of swelling, the residue after 24 hours of extraction with p-xylene at 120° C. were measured. The measurements were substituted in the equation (1).

Measurement of Dynamic Viscoelasticity of Crosslinked Foam

Using a compression type dynamic mechanical analyzer (DVE-V4, produced by Rheology Inc.), the temperature dependence of dynamic viscoelasticity (storage modulus E', loss modulus E", loss tangent tan δ) was measured at a temperature of from −150° C. to 150° C. in a compression mode. The measurement was conducted at a frequency of 10 Hz and a temperature rising rate of 2° C./min. Since the foam can be hardly measured accurately for section area, etc., E' and E" were not absolute values. Thus, these values were standardized by E' at −150° C. for comparison.

Measurement of Dynamic Viscoelasticity of Polyethylene Resin

Using a parallel disc type rheometer (MR-500, produced by Rheology Inc.), the frequency dependence of dynamic viscoelasticity (shear storage elasticity G', shear loss elasticity G") in a linear range was measured at some points in the range of from 145° C. to 250° C. The resulting curve of G' and G" with the temperature at which stretch viscosity is measured as reference temperature was obtained. Using Ozaki's equation (Ozaki et al., "Journal of The Society of Rheology, Japan", 16, page 53 (1988)), the time dependence of extensional viscosity in a linear range was calculated from the resulting curve.

Measurement of Extensional Viscosity

Using MELTEN Rheometer (produced by Toyo Seiki Seisakusho, Ltd.), the change of extensional viscosity with time was measured at an extensional strain rate of $0.1\ \text{sec}^{-1}$. The measurement was conducted at a temperature of 160° C. The value of extensional viscosity (calculated) in a linear range at the time tm at which the extensional viscosity reaches maximum value is defined to be $\eta 1\ (tm)$. The value obtained by dividing the measured maximum value $\eta e\ (tm)$ of extensional viscosity by $\eta 1\ (tm)$ is defined to be non-linear parameter ($\lambda$) as an index of strain hardening of extensional viscosity.

Measurement of Melt Tension

For the evaluation of melt tension, a capillary rheometer (Capillograph, produced by Toyo Seiki Seisakusho, Ltd.) was used.

The cylinder temperature was 160° C. The inner diameter of the cylinder was 9.55 mm. L/D ratio of the die was 8/2.095 (mm). Under these conditions, tension developed when the piston moves downward at a rate of 10 mm/min and withdrawal is conducted at a rate of 10 m/min was measured.

Measurement of Break Strength of Foam and Dimensional Change Due to Heating

The break strength and heating dimensional change of foam were measured according to JIS K 6767.

Restriction of Molding Method

For the evaluation of formability, it was judged to see if the material which had been molded at one-shot press-molding was then foamed at two-shot press-molding.

One-shot press molding: Only one-shot press-molding can be made, two-shot press-molding cannot be made None: Two-shot press-molding can be made after one-shot press-molding

EXAMPLE 1

100 Parts by weight of LLDPE (trade name: EXACT3028, produced by Exxon Chemical Company; MFR: 1.2 g/10 min) having a density of 0.898 g/cm$^3$ and a weight average molecular weight of 69,000 prepared in the presence of a metallocene catalyst were mixed with 30 parts by weight of a low molecular polyethylene wax having a viscosity average molecular weight of 4,300 and a melting point of 105° C. (trade name: Mitsui Highwax NL500, produced by Mitsui Chemical Inc.; density: 0.920 g/cm$^3$). The mixture was then kneaded at a temperature of 130° C. over a mixing roll for 5 minutes so that it was adjusted to obtain a polyolefin resin composition.

100 Parts by weight of the polyolefin resin composition thus obtained were then mixed with 8.0 parts by weight of dinitrosopentamethylene tetramine as a thermally decomposable foaming agent, 8.0 parts by weight of urea as a foaming aid, and 0.5 parts by weight of dicumyl peroxide as an organic peroxide. The material was then kneaded over a mixing roll which had been adjusted to a temperature of 125° C. to obtain a sheet-like composition which was then packed in a pressure sealed mold having a size of 20 mm thickness×90 mm length×90 mm width. The material was then heated to a temperature of 165° C. under an external pressure of 200 Kgf/cm$^2$ for 20 minutes. The external pressure was then removed. As a result, a polyolefin-based crosslinked foam having uniform fine cells was obtained.

The foam thus obtained had a uniform surface and fine cells. The foam was obtained at an expansion ratio of 24 and thus had a gel fraction of 50%. The formulation of the foam and the physical properties of resin are set forth in Table 1. The physical properties of the foam thus obtained are shown in Table 2.

EXAMPLE 2

A polyolefin-based crosslinked foam was obtained in the same manner as in Example 1 except that the added amount of dicumyl peroxide was 0.7 parts by weight.

The foam thus obtained had a uniform surface and fine cells. The foam was obtained at an expansion ratio of 20 and thus had a gel fraction of 72%. The formulation of the foam and the physical properties of resin are set forth in Table 1. The physical properties of the foam thus obtained are shown in Table 2.

EXAMPLE 3

A polyolefin-based crosslinked foam was obtained in the same manner as in Example 2 except that the added amount of wax was 10 parts by weight.

The foam thus obtained had a uniform surface and fine cells. The foam was obtained at an expansion ratio of 20 and thus had a gel fraction of 89%. The formulation of the foam and the physical properties of resin are set forth in Table 1. The physical properties of the foam thus obtained are shown in Table 2.

EXAMPLE 4

A polyolefin-based crosslinked foam was obtained in the same manner as in Example 2 except that the added amount of wax was 5 parts by weight.

The foam thus obtained had a uniform surface and fine cells. The foam was obtained at an expansion ratio of 20 and thus had a gel fraction of 80%. The formulation of the foam and the physical properties of resin are shown in Table 1. The physical properties of the foam thus obtained are shown in Table 2.

EXAMPLE 5

100 Parts by weight of LLDPE (trade name: Affinity PL1840, produced by Dow Chemical Company; MFR: 0.97 g/10 min) exhibiting a density of 0.913 g/cm$^3$ and a weight average molecular weight of 76, 000 and having a long-chain branch in its molecule prepared in the presence of a geometrically constraint catalyst (CGC) were mixed with 30 parts by weight of a low molecular polyethylene wax having a viscosity average molecular weight of 4,300 and a melting point of 105° C. (tradename: Mitsui Highwax NL500, produced by Mitsui Chemical Inc.; density: 0.920 g/cm$^3$). The mixture was then kneaded at a temperature of 130° C. over a mixing roll for 5 minutes so that it was adjusted to obtain a polyolefin resin composition.

100 Parts by weight of the polyolefin resin composition thus obtained were then mixed with 16.0 parts by weight of azodicarbonamide as a thermally decomposable foaming agent, 0.2 parts by weight of zinc stearate and 0.3 parts by weight of zinc oxide as foaming accelerator, and 0.7 parts by weight of dicumyl peroxide as an organic peroxide. The mixture was then kneaded over a mixing roll which had been adjusted to a temperature of 125° C. to obtain a sheet-like composition which was then packed in a pressure sealed mold having a size of 20 mm thickness×90 mm length×90 mm width. The composition was then heated to a temperature of 165° C. under an external pressure of 200 Kgf/cm$^2$ for 20 minutes. The external pressure was then removed. As a result, a polyolefin-based crosslinked foam having uniform fine cells was obtained at an expansion ratio of 10 at a one-shot press-molding method. The foam thus obtained was put in an oven which had been adjusted to a temperature of 165° C. where it was then heated and foamed at ordinary pressure for 20 minutes.

The foam thus obtained had a uniform surface and fine cells. The foam was obtained at an expansion ratio of 29 and thus had a gel fraction of 82%.

The formulation of the foam and the physical properties of resin are shown in Table 1. The physical properties of the foam thus obtained are shown in Table 2.

EXAMPLE 6

To 100 parts by weight of HDPE (trade name: Nipolon-hard 4010, produced by TOSOH CORP; MFR: 5 g/10 min) having a density of 0.965 g/cm$^3$ and a weight average molecular weight of 88,000 prepared in the presence of a Ziegler catalyst were added 200 ppm of α,α-ditertiarybutylperoxyisopropyl benzene (Perbutyl P, produced by NOF Corp.) as a peroxide. The mixture was then melt-kneaded over a single-screw extruder the cylinder of which had been adjusted to a temperature of 220° C. to undergo treatment with peroxide so that MFR thereof was lowered to 1. The material was mixed with 30 parts by weight of a low molecular polyethylene wax having a viscosity average molecular weight of 4,300 and a melting point of 105° C. (trade name: Mitsui Highwax NL500, produced by Mitsui Chemical Inc.; density: 0.920 g/cm$^3$), and then kneaded over a mixing roll at a temperature of 130° C. for 5 minutes so that it was adjusted to obtain a polyolefin resin composition.

100 Parts by weight of the polyolefin resin composition thus obtained were then mixed with 16.0 parts by weight of azodicarbonamide as a thermally decomposable foaming agent, 0.2 parts by weight of zinc stearate and 0.3 parts by weight of zinc oxide as foaming accelerator, and 0.7 parts by weight of dicumyl peroxide as an organic peroxide. The mixture was then kneaded over a mixing roll which had been adjusted to a temperature of 145° C. to obtain a sheet-like composition which was then packed in a pressure sealed mold having a size of 20 mm thickness×90 mm length×90 mm width. The composition was then heated to a temperature of 165° C. under an external pressure of 200 Kgf/cm$^2$ for 20 minutes. The external pressure was then removed. As a result, a polyolefin-based crosslinked foam having uniform fine cells was obtained at an expansion ratio of 10 at one-shot press molding method. The foam thus obtained was put in an oven which had been adjusted to a temperature of 165° C. where it was then heated and foamed at ordinary pressure for 20 minutes.

The foam thus obtained had a uniform surface and fine cells. The foam was obtained at a foaming ratio of 30 and thus had a gel fraction of 70%. The formulation of the foam and the physical properties of resin are shown in Table 1. The physical properties of the foam thus obtained are shown in Table 2.

EXAMPLE 7

To 100 parts by weight of LLDPE (MFR: 4.2 g/10 min) having a density of 0.905 g/cm$^3$ and a weight average molecular weight of 74,000 prepared in the presence of a metallocene catalyst were added 100 ppm of α,α-ditertiarybutylperoxyisopropyl benzene (Perbutyl P, produced by NOF Corp.) as a peroxide. The mixture was then melt-kneaded over a single-screw extruder the cylinder of which had been adjusted to a temperature of 220° C. to undergo treatment with peroxide so that MFR thereof was lowered to 0.8. The material was mixed with 30 parts by weight of a low molecular polyethylene wax having a viscosity average molecular weight of 4,300 and a melting point of 105° C. (trade name: Mitsui Highwax NL500, produced by Mitsui Chemical Inc.; density: 0.920 g/cm$^3$), and then kneaded over a mixing roll at a temperature of 130° C. for 5 minutes so that it was adjusted to obtain a polyolefin resin composition.

100 parts by weight of the polyolefin resin composition thus obtained were then mixed with 16.0 parts by weight of azodicarbonamide as a thermally decomposable foaming agent, 0.2 parts by weight of zinc stearate and 0.3 parts by weight of zinc oxide as foaming accelerator, and 0.7 parts by weight of dicumyl peroxide as an organic peroxide. The mixture was then kneaded over a mixing roll which had been adjusted to a temperature of 145° C. to obtain a sheet-like composition which was then packed in a pressure sealed mold having a size of 20 mm thickness×90 mm length×90 mm width. The composition was then heated to a temperature of 165° C. under an external pressure of 200 Kgf/cm² for 20 minutes. The external pressure was then removed. As a result, a polyolefin-based crosslinked foam having uniform fine cells was obtained at a foaming ratio of 10 at one-shot press-molding method. The foam thus obtained was put in an oven which had been adjusted to a temperature of 165° C. where it was then heated and foamed at ordinary pressure for 20 minutes.

The foam thus obtained had a uniform surface and fine cells. The foam was obtained at an expansion ratio of 30 and thus had a gel fraction of 72%. The formulation of the foam and the physical properties of resin are shown in Table 1. The physical properties of the foam thus obtained are shown in Table 2.

EXAMPLE 8

To 100 parts by weight of LLDPE (MFR: 4.2 g/10 min) having a density of 0.920 g/cm³ and a weight average molecular weight of 69,000 prepared in the presence of a metallocene catalyst were added 150 ppm of α,α-ditertiarybutylperoxyisopropyl benzene (Perbutyl P, produced by NOF Corp.) as a peroxide. The mixture was then melt-kneaded over a single-screw extruder the cylinder of which had been adjusted to a temperature of 220° C. to undergo treatment with peroxide so that MFR thereof was lowered to 1. The material was mixed with 30 parts by weight of a low molecular polyethylene wax having a viscosity-average molecular weight of 4,300 and a melting point of 105° C. (trade name: Mitsui Highwax NL500, produced by Mitsui Chemical Inc.; density: 0.920 g/cm³), and then kneaded over a mixing roll at a temperature of 130° C. for 5 minutes so that it was adjusted to obtain a polyolefin resin composition.

100 Parts by weight of the polyolefin resin composition thus obtained were then mixed with 16.0 parts by weight of azodicarbonamide as a thermally decomposable foaming agent, 0.2 parts by weight of zinc stearate and 0.3 parts by weight of zinc oxide as foaming accelerator, and 0.7 parts by weight of dicumyl peroxide as an organic peroxide. The mixture was then kneaded over a mixing roll which had been adjusted to a temperature of 145° C. to obtain a sheet-like composition which was then packed in a pressure sealed mold having a size of 20 mm thickness×90 mm length×90 mm width. The composition was then heated to a temperature of 165° C. under an external pressure of 200 Kgf/cm² for 20 minutes. The external pressure was then removed. As a result, a polyolefin-based crosslinked foam having uniform fine cells was obtained at an expansion ratio of 10 at one-shot press-molding method. The foam thus obtained was put in an oven which had been adjusted to a temperature of 165° C. where it was then heated and foamed at ordinary pressure for 20 minutes.

The foam thus obtained had a uniform surface and fine cells. The foam was obtained at an expansion ratio of 30 and thus had a gel fraction of 65%. The formulation of the foam and the physical properties of resin are shown in Table 1. The physical properties of the foam thus obtained are shown in Table 2.

EXAMPLE 9

A polyolefin-based crosslinked foam was obtained in the same manner as in Example 1 except that as LLDPE there was used LLDPE (Lumitack 22-1, produced by TOSOH CORP.; MFR: 2.0 g/10 min) having a density of 0.900 g/cm³ and a weight average molecular weight of 85,000 prepared in the presence of a Ziegler catalyst and the added amount of dicumyl peroxide was 0.7 parts by weight.

The foam thus obtained had a uniform surface and fine cells. The foam was obtained at an expansion ratio of 20 and thus had a gel fraction of 75%. The formulation of the foam and the physical properties of resin are shown in Table 1. The physical properties of the foam thus obtained are shown in Table 2.

EXAMPLE 10

A polyolefin-based crosslinked foam was obtained in the same manner as in Example 1 except that as LLDPE there was used LLDPE (Nipolon-L, produced by TOSOH CORP.; MFR: 3.0 g/10 min) having a density of 0.935 g/cm³ and a weight average molecular weight of 89,000 prepared in the presence of a Ziegler catalyst and the added amount of dicumyl peroxide was 0.7 parts by weight.

The foam thus obtained had a uniform surface and fine cells. The foam was obtained at an expansion ratio of 20 and thus had a gel fraction of 73%. The formulation of the foam and the physical properties of resin are shown in Table 1. The physical properties of the foam thus obtained are shown in Table 2.

EXAMPLE 11

A polyolefin-based crosslinked foam was obtained in the same manner as in Example 1 except that as LLDPE there was used LLDPE (Lumitack 22-1, produced by TOSOH CORP.; MFR: 2.0 g/10 min) having a density of 0.900 g/cm³ and a weight average molecular weight of 85,000 prepared in the presence of a Ziegler catalyst, as the low molecular polyethylene wax there was used a low molecular polyethylene wax having a viscosity average molecular weight of 6,400 and a melting point of 105° C. (trade name: Mitsui Highwax NL800, produced by Mitsui Chemical Inc.; density: 0.920 g/cm³) and the added amount of dicumyl peroxide was 0.7 parts by weight.

The foam thus obtained had a uniform surface and fine cells. The foam was obtained at an expansion ratio of 20 and thus had a gel fraction of 70%. The formulation of the foam and the physical properties of resin are shown in Table 1. The physical properties of the foam thus obtained are shown in Table 2.

EXAMPLE 12

A polyolefin-based crosslinked foam was obtained in the same manner as in Example 1 except that as LLDPE there was used LLDPE (Lumitack 22-1, produced by TOSOH CORP.; MFR: 2.0 g/10 min) having a density of 0.900 g/cm³ and a weight average molecular weight of 85,000 prepared in the presence of a Ziegler catalyst, as the low molecular polyethylene wax there was used a low molecular polyethylene wax having a viscosity average molecular weight of 7,000 and a melting point of 145° C. (trade name: Mitsui Highwax NP055, produced by Mitsui Chemical Inc.; density: 0.900 g/cm³) and the added amount of dicumyl peroxide was 0.7 parts by weight.

The foam thus obtained had a uniform surface and fine cells. The foam was obtained at an expansion ratio of 20 and thus had a gel fraction of 70%. The formulation of the foam and the physical properties of resin are shown in Table 1. The physical properties of the foam thus obtained are shown in Table 2.

EXAMPLE 13

A polyolefin-based crosslinked foam was obtained in the same manner as in Example 1 except that as LLDPE there was used LLDPE (Lumitack 22-1, produced by TOSOH CORP.; MFR: 2.0 g/10 min) having a density of 0.900 g/cm$^3$ and a weight average molecular weight of 85,000 prepared in the presence of a Ziegler catalyst, as the low molecular polyethylene wax there was used a low molecular polyethylene wax having a viscosity average molecular weight of 4,000 and a melting point of 118° C. (trade name: Mitsui Highwax 410P, produced by Mitsui Chemical Inc.; density: 0.950 g/cm$^3$) and the added amount of dicumyl peroxide was 0.7 parts by weight.

The foam thus obtained had a uniform surface and fine cells. The foam was obtained at an expansion ratio of 20 and thus had a gel fraction of 72%. The formulation of the foam and the physical properties of resin are shown in Table 1. The physical properties of the foam thus obtained are shown in Table 2.

Comparative Example 1

Forming was effected in the same manner as in Example 1 except that as LLDPE there was used LDPE (trade name: Petrocene 190, produced by TOSOH CORP.; MFR: 4.0 g/10min) having a density of 0.921 g/cm$^3$ and a weight average molecular weight of 55,000 prepared by high pressure radical polymerization, there was added no low molecular polyethylene wax and the added amount of dicumyl peroxide was 0.2 parts by weight. However, since gas escaped, no foam was obtained. This sample has a gel fraction of 9%. The formulation of the foam and the physical properties of resin are shown in Table 1. The physical properties of the foam thus obtained are shown in Table 2.

Comparative Example 2

A polyolefin-based crosslinked foam was obtained in the same manner as in Example 1 except that as LLDPE there was used LDPE (trade name: Petrocene 190, produced by TOSOH CORP.; MFR: 4.0 g/10min) having a density of 0.921 g/cm$^3$ and a weight average molecular weight of 55,000 prepared by high pressure radical polymerization and there was added no low molecular polyethylene wax.

The foam thus obtained had a uniform surface and fine cells. The foam was obtained at an expansion ratio of 25 and thus had a gel fraction of 30%. The formulation of the foam and the physical properties of resin are shown in Table 1. The physical properties of the foam thus obtained are shown in Table 2.

Comparative Example 3

A polyolefin-based crosslinked foam was obtained in the same manner as in Example 1 except that as LLDPE there was used LDPE (trade name: Petrocene 190, produced by TOSOH CORP.; MFR: 4.0 g/10min) having a density of 0.921 g/cm$^3$ and a weight average molecular weight of 55,000 prepared by high pressure radical polymerization, there was added no low molecular polyethylene wax and the added amount of dicumyl peroxide was 0.7 parts by weight.

The foam thus obtained had a uniform surface and fine cells. The foam was obtained at an expansion ratio of 25 and thus had a gel fraction of 46%. The formulation of the foam and the physical properties of resin are shown in Table 1. The physical properties of the foam thus obtained are shown in Table 2.

Comparative Example 4

A polyolefin-based crosslinked foam was obtained in the same manner as in Example 1 except that as LLDPE there was used LDPE (trade name: Petrocene 190, produced by TOSOH CORP.; MFR: 4.0 g/10 min) having a density of 0.921 g/cm$^3$ and a weight average molecular weight of 55,000 prepared by high pressure radical polymerization, there was added no low molecular polyethylene wax and the added amount of dicumyl peroxide was 0.9 parts by weight.

However, the foam thus obtained underwent cracking all over the surface thereof and thus could not form a good foam. The formulation of the foam and the physical properties of resin are shown in Table 1. The physical properties of the foam thus obtained are shown in Table 2.

Comparative Example 5

A polyolefin-based crosslinked foam was obtained in the same manner as in Example 1 except that as LLDPE there was used LDPE (trade name: Petrocene 190, produced by TOSOH CORP.; MFR: 4.0 g/10 min) having a density of 0.921 g/cm$^3$ and a weight average molecular weight of 55,000 prepared by high pressure radical polymerization, there was added no low molecular polyethylene wax and the added amount of dicumyl peroxide was 1.1 parts by weight.

The foam thus obtained underwent cracking all over the surface thereof and thus could not form a uniform foam. The formulation of the foam and the physical properties of resin are shown Table 1. The physical properties of the foam thus obtained are shown in Table 2.

Comparative Example 6

A polyolefin-based crosslinked foam was obtained in the same manner as in Example 1 except that there was added no low molecular polyethylene wax and the added amount of dicumyl peroxide was 0.5 parts by weight.

The foam thus obtained had a uniform surface and fine cells. The foam was obtained at an expansion ratio of 9 and thus had a gel fraction of 97%. The formulation of the foam and the physical properties of resin are shown in Table 1. The physical properties of the foam thus obtained are shown in Table 2.

Comparative Example 7

A polyolefin-based crosslinked foam was obtained in the same manner as in Example 1 except that there was added no low molecular polyethylene wax and the added amount of dicumyl peroxide was 0.7 parts by weight.

The foam thus obtained had a uniform surface and fine cells. The foam was obtained at an expansion ratio of 6 and thus had a gel fraction of 98%. The formulation of the foam and the physical properties of resin are shown in Table 1. The physical properties of the foam thus obtained are shown in Table 2.

Comparative Example 8

A polyolefin-based crosslinked foam was obtained in the same manner as in Example 1 except that there was added no low molecular polyethylene wax and the added amount of dicumyl peroxide was 0.9 parts by weight.

The foam thus obtained had a uniform surface and fine cells. The foam was obtained at an expansion ratio of 6 and thus had a gel fraction of 98.5%. The formulation of the foam and the physical properties of resin are shown in Table 1. The physical properties of the foam thus obtained are shown in Table 2.

Comparative Example 9

A polyolefin-based crosslinked foam was obtained in the same manner as in Example 1 except that there was added no low molecular polyethylene wax and the added amount of dicumyl peroxide was 0.4 parts by weight.

The foam thus obtained had not fine cells since gas had escaped. The foam had a gel fraction of 78%. The formulation of the foam and the physical properties of resin are shown in Table 1. The physical properties of the foam thus obtained are shown in Table 2.

Comparative Example 10

A polyolefin-based crosslinked foam was obtained in the same manner as in Example 1 except that as LLDPE there was used LDPE (trade name: Petrocene 190, produced by TOSOH CORP.; MFR: 4.0 g/10min) having a density of 0.920 g/cm³ and a weight-average molecular weight of 20,000 prepared by high pressure radical polymerization, there was added no low molecular polyethylene wax and the added amount of dicumyl peroxide was 0.5 parts by weight.

The foam thus obtained had a uniform surface but ununiform cells. The foam was obtained at an expansion ratio of 20 and thus had a gel fraction of 60%. The formulation of the foam and the physical properties of resin are shown in Table 1. The physical properties of the foam thus obtained are shown in Table 2.

TABLE 1

| | Polyolefin resin | | | | | | Wax | | | Added amount of additive*[2] | | |
|---|---|---|---|---|---|---|---|---|---|---|---|---|
| | Resin | Density | MFR | Molecular weight | Melt tension | λ | Molecular weight | Melting point | Added amount*[1] | Foaming gent | Foaming aid | Peroxide |
| Example 1 | LLDPE | 0.898 | 1.2 | 69,000 | 20 | 1 | 4,300 | 105 | 30 | 8 | 8 | 0.5 |
| Example 2 | LLDPE | 0.898 | 1.2 | 69,000 | 20 | 1 | 4,300 | 105 | 30 | 8 | 8 | 0.7 |
| Example 3 | LLDPE | 0.898 | 1.2 | 69,000 | 20 | 1 | 4,300 | 105 | 10 | 8 | 8 | 0.7 |
| Example 4 | LLDPE | 0.898 | 1.2 | 69,000 | 20 | 1 | 4,300 | 105 | 5 | 8 | 8 | 0.7 |
| Example 5 | LLDPE | 0.913 | 0.9 | 76,000 | 160 | 6 | 4,300 | 105 | 30 | 16 | — | 0.7 |
| Example 6 | HDPE | 0.965 | 1 | 88,000 | 140 | 4 | 4,300 | 105 | 5 | 16 | — | 0.7 |
| Example 7 | LLDPE | 0.905 | 0.8 | 74,000 | 140 | 6 | 4,300 | 105 | 30 | 16 | — | 0.7 |
| Example 8 | LLDPE | 0.920 | 1 | 69,000 | 125 | 6 | 4,300 | 105 | 30 | 16 | — | 0.7 |
| Example 9 | LLDPE | 0.900 | 2 | 85,000 | 20 | 1 | 4,300 | 105 | 30 | 8 | 8 | 0.7 |
| Example 10 | LLDPE | 0.935 | 3 | 89,000 | 20 | 1 | 4,300 | 105 | 30 | 8 | 8 | 0.7 |
| Example 11 | LLDPE | 0.900 | 2 | 85,000 | 20 | 1 | 6,400 | 105 | 30 | 8 | 8 | 0.7 |
| Example 12 | LLDPE | 0.900 | 2 | 85,000 | 20 | 1 | 7,000 | 145 | 30 | 8 | 8 | 0.7 |
| Example 13 | LLDPE | 0.900 | 2 | 85,000 | 20 | 1 | 4,000 | 118 | 30 | 8 | 8 | 0.7 |
| Comparative Example 1 | LDPE | 0.921 | 4 | 55,000 | 190 | 12 | — | — | — | 8 | 8 | 0.2 |
| Comparative Example 2 | LDPE | 0.921 | 4 | 55,000 | 190 | 12 | — | — | — | 8 | 8 | 0.5 |
| Comparative Example 3 | LDPE | 0.921 | 4 | 55,000 | 190 | 12 | — | — | — | 8 | 8 | 0.7 |
| Comparative Example 4 | LDPE | 0.921 | 4 | 55,000 | 190 | 12 | — | — | — | 8 | 8 | 0.9 |
| Comparative Example 5 | LDPE | 0.921 | 4 | 55,000 | 190 | 12 | — | — | — | 8 | 8 | 1.1 |
| Comparative Example 6 | LLDPE | 0.898 | 1.2 | 69,000 | 20 | 1 | — | — | — | 8 | 8 | 0.5 |
| Comparative Example 7 | LLDPE | 0.898 | 1.2 | 69,000 | 20 | 1 | — | — | — | 8 | 8 | 0.7 |
| Comparative Example 8 | LLDPE | 0.898 | 1.2 | 69,000 | 20 | 1 | — | — | — | 8 | 8 | 0.9 |
| Comparative Example 9 | LLDPE | 0.898 | 1.2 | 69,000 | 20 | 1 | — | — | — | 8 | 8 | 0.4 |
| Comparative Example 10 | LDPE | 0.920 | 0.3 | 200,000 | 210 | 13 | — | — | — | 8 | 8 | 0.5 |

Notes:
*[1]Based on 100 parts by weight of polyolefin resin
*[2]Based on 100 parts by weight of polyolefin resin composition

TABLE 2

| | Physical properties of foam | | | | | | | | |
|---|---|---|---|---|---|---|---|---|---|
| | Gel fraction | Degree of swelling | expansion ratio | Number of tan δ | α | Foamed state | Break strength | Dimensional change | Restriction of forming method |
| Example 1 | 50 | 29 | 24 | 1 | 13 | Uniform | 12.8 | −0.9 | One-shot press-molding |
| Example 2 | 72 | 16 | 20 | 1 | 13 | Uniform | 11.5 | −0.9 | One-shot press-molding |
| Example 3 | 89 | 10 | 20 | 1 | 12 | Uniform | 11.2 | −0.9 | One-shot press-molding |
| Example 4 | 80 | 15 | 20 | 1 | 11 | Uniform | 11.3 | −0.9 | One-shot press-molding |
| Example 5 | 82 | 14 | 29 | 1 | 14 | Uniform | 11.5 | −0.9 | None |
| Example 6 | 70 | 20 | 30 | 0 | 13 | Uniform | 11.9 | 0.1 | None |
| Example 7 | 72 | 16 | 30 | 1 | 12 | Uniform | 12.5 | −0.5 | None |

TABLE 2-continued

Physical properties of foam

|  | Gel fraction | Degree of swelling | expansion ratio | Number of tan δ | α | Foamed state | Break strength | Dimensional change | Restriction of forming method |
|---|---|---|---|---|---|---|---|---|---|
| Example 8 | 65 | 22 | 30 | 1 | 13 | Uniform | 12.3 | −0.7 | None |
| Example 9 | 75 | 19 | 20 | 1 | 13 | Uniform | 11 | −0.9 | One-shot press-molding |
| Example 10 | 73 | 19 | 20 | 1 | 12 | Uniform | 11 | −0.9 | One-shot press-molding |
| Example 11 | 70 | 17 | 20 | 1 | 13 | Uniform | 10.8 | −0.9 | One-shot press-molding |
| Example 12 | 72 | 17 | 20 | 1 | 13 | Uniform | 10.6 | −0.9 | One-shot press-molding |
| Example 13 | 72 | 16 | 20 | 1 | 13 | Uniform | 10.5 | −0.9 | One-shot press-molding |
| Comparative Example 1 | 9 | 250 | Gas escaped | 2< | — | — | — | — | — |
| Comparative Example 2 | 30 | 110 | 25 | 2< | 13 | Ununiform | 6 | −2.3 | None |
| Comparative Example 3 | 46 | 82 | 25 | 2< | 12 | Ununiform | 6 | −2.3 | None |
| Comparative Example 4 | 68 | 33 | Cracked | 2< | — | — | — | — | — |
| Comparative Example 5 | 74 | 15 | Cracked | 2< | — | — | — | — | — |
| Comparative Example 6 | 97 | 7 | 9 | 1 | 9 | Uniform | 11.5 | −1.5 | One-shot press-molding |
| Comparative Example 7 | 98 | 6 | 6 | 1 | 8 | Uniform | 11 | −1.5 | One-shot press-molding |
| Comparative Example 8 | 98.5 | 4 | 6 | 1 | 7 | Uniform | 11 | −1.5 | One-shot press-molding |
| Comparative Example 9 | 78 | 16 | Gas escaped | 1 | — | — | — | — | — |
| Comparative Example 10 | 60 | 35 | 20 | 2< | 13 | Uniform | 6 | −2.1 | None |

The use of the polyolefin resin composition of the invention makes it possible to obtain a foam having uniform cells and a high toughness at a high expansion ratio in various crosslinking methods while maintaining excellent properties of polyolefin resin. Further, high formability which can hardly be attained by the prior art can be attained, making attribution to the enhancement of productivity.

What is claimed is:

1. A polyolefin-based crosslinked foam having the following characteristics (a) to (c) obtained by the crosslinked foaming of a foaming polyolefin resin composition comprising a polyolefin resin composition and a foaming agent:

(a) Gel fraction represented by the residue obtained by extracting with p-xylene at 120° C. for 24 hours, and then immediately drying at 80° C. and 10 mmHg for 24 hours is from 10% to 90%;

(b) Degree of swelling represented by the following equation (1) is not greater than 30:

$$\text{Degree of Swelling} = \frac{\text{Residue (g) shortly after 24 hours of extraction with p-xylene at 120° C.}}{\text{Residue (g) obtained by extracting with p-xylene at 120° C. for 24 hours, and then immediately drying at 80 C. and 10 mmHg for 24 hours}} \quad (1)$$

and;

(c) When glass transition point determined from the temperature dependence of dynamic viscoelasticity is represented by the peak of tan δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) ($\alpha = \log E'_0/E'_{100}$) is from 10 to 30.

2. The foam according to claim 1, wherein said polyolefin resin composition comprises 100 parts by weight of a polyolefin resin and from 5 to 50 parts by weight of a low molecular polyolefin wax.

3. A polyolefin-based crosslinked foam having the following characteristics (a) to (c) obtained by the crosslinked foaming of a foaming polyolefin resin composition comprising a polyolefin resin composition comprising 100 parts by weight of a polyolefin resin having a density of from 0.860 to 0.970 g/cm³ and a weight average molecular weight of 60,000 or more as determined by gel permeation chromatography and from 5 to 50 parts by weight of a low molecular polyolefin wax having a viscosity average molecular weight of from 1,500 to 10,000 as determined by a viscosity method and a melting point of from 100° C. to 160° C. as determined by DSC method, and a foaming agent:

(a) Gel fraction represented by the residue obtained by extracting with p-xylene at 120° C. for 24 hours, and then immediately drying at 80° C. and 10 mmHg for 24 hours is from 10% to 90%;

(b) Degree of swelling represented by the following equation (1) is not greater than 30:

$$\text{Degree of Swelling} = \frac{\text{Residue (g) shortly after 24 hours of extraction with p-xylene at 120° C.}}{\text{Residue (g) obtained by extracting with p-xylene at 120° C. for 24 hours, and then immediately drying at 80 C. and 10 mmHg for 24 hours}} \quad (1)$$

and;

(c) When glass transition point determined from the temperature dependence of dynamic viscoelasticity is represented by the peak of tan δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) (α=log $E'_0/E'_{100}$) is from 10 to 30.

4. The foam according to claim 2, wherein said polyolefin resin is a straight-chain ethylene homopolymer or a straight-chain ethylene-α-olefin copolymer comprising ethylene and a $C_3$–$C_{12}$ α-olefin.

5. The foam according to claim 3, wherein said polyolefin resin is a straight-chain ethylene homopolymer or a straight-chain ethylen-α-olefin copolymer comprising ethylene and a $C_3$–$C_{12}$ α-olefin.

6. The foam according to claim 4, wherein said polyolefin resin satisfies the following requirements (a) to (c):
  (a) MFR at 190° C. and a load of 2,160 g is from 0.1 to 30 g/10 min;
  (b) Melt tension determined when stretched at a draw ratio of 50 using a capillary rheometer having a die size L/D of 8/2.095 (mm) and a cylinder temperature of 160° C. is from 50 to 300 mN; and
  (c) Non-linear parameter which is an index of strain hardening of extensional viscosity is 2 or more.

7. The foam according to claim 5, wherein said polyolefin resin satisfies the following requirements (a) to (c):
  (a) MFR at 190° C. and a load of 2,160 g is from 0.1 to 30 g/10 min;
  (b) Melt tension determined when stretched at a draw ratio of 50 using a capillary rheometer having a die size L/D of 8/2.095 (mm) and a cylinder temperature of 160° C. is from 50 to 300 mN; and
  (c) Non-linear parameter which is an index of strain hardening of extensional viscosity is 2 or more.

8. The foam according to claim 2, wherein said low molecular polyolefin wax is a low molecular polyethylene wax.

9. The foam according to claim 3, wherein said low molecular polyolefin wax is a low molecular polyethylene wax.

10. The foam according to claim 4, wherein said low molecular polyolefin wax is a low molecular polyethylene wax.

11. The foam according to claim 5, wherein said low molecular polyolefin wax is a low molecular polyethylene wax.

12. The foam according to claim 6, wherein said low molecular polyolefin wax is a low molecular polyethylene wax.

13. The foam according to claim 7, wherein said low molecular polyolefin wax is a low molecular polyethylene wax.

14. The foam according to claim 1, wherein said foaming polyolefin resin composition comprises 100 parts by weight of the polyolefin resin composition and from 2 to 30 parts by weight of the foaming agent.

15. The foam according to claim 2, wherein said foaming polyolefin resin composition comprises 100 parts by weight of the polyolefin resin composition and from 2 to 30 parts by weight of the foaming agent.

16. The foam according to claim 3, wherein said foaming polyolefin resin composition comprises 100 parts by weight of the polyolefin resin composition and from 2 to 30 parts by weight of the foaming agent.

17. The foam according to claim 4, wherein said foaming polyolefin resin composition comprises 100 parts by weight of the polyolefin resin composition and from 2 to 30 parts by weight of the foaming agent.

18. The foam according to claim 5, wherein said foaming polyolefin resin composition comprises 100 parts by weight of the polyolefin resin composition and from 2 to 30 parts by weight of the foaming agent.

19. The foam according to claim 6, wherein said foaming polyolefin resin composition comprises 100 parts by weight of the polyolefin resin composition and from 2 to 30 parts by weight of the foaming agent.

20. The foam according to claim 7, wherein said foaming polyolefin resin composition comprises 100 parts by weight of the polyolefin resin composition and from 2 to 30 parts by weight of the foaming agent.

21. The foam according to claim 8, wherein said foaming polyolefin resin composition comprises 100 parts by weight of the polyolefin resin composition and from 2 to 30 parts by weight of the foaming agent.

22. The foam according to claim 9, wherein said foaming polyolefin resin composition comprises 100 parts by weight of the polyolefin resin composition and from 2 to 30 parts by weight of the foaming agent.

23. The foam according to claim 10, wherein said foaming polyolefin resin composition comprises 100 parts by weight of the polyolefin resin composition and from 2 to 30 parts by weight of the foaming agent.

24. The foam according to claim 11, wherein said foaming polyolefin resin composition comprises 100 parts by weight of the polyolefin resin composition and from 2 to 30 parts by weight of the foaming agent.

25. The foam according to claim 12, wherein said foaming polyolefin resin composition comprises 100 parts by weight of the polyolefin resin composition and from 2 to 30 parts by weight of the foaming agent.

26. The foam according to claim 13, wherein said foaming polyolefin resin composition comprises 100 parts by weight of the polyolefin resin composition and from 2 to 30 parts by weight of the foaming agent.

27. A polyolefin-based crosslinked foam having the following characteristics (a) to (c) obtained by the crosslinked foaming of a foaming polyolefin resin composition comprising 100 parts by weight of a polyolefin resin composition comprising (i) 100 parts by weight of a straight-chain ethylene homopolymer or a straight-chain ethylene-α-olefin copolymer comprising ethylene and a $C_3$–$C_{12}$ α-olefin, having a density of from 0.860 to 0.970 g/cm³, a weight average molecular weight of 60,000 or more as determined by gel permeation chromatography, MFR of from 0.1 to 30 g/10 min at 190° C. and a load of 2,160 g, a melt tension of from 50 to 300 mN as determined when stretched at a draw ratio of 50 using a capillary rheometer having a die size L/D of 8/2.095 (mm) and a cylinder temperature of 160° C. and a non-linear parameter of 2 or more as an index of strain hardening of extensional viscosity, and (ii) from 5 to 50 parts by weight of a low molecular polyolefin wax having a viscosity average molecular weight of from 1,500 to 10,000 as determined by a viscosity method and a melting point of from 100° C. to 160° C. as determined by DSC method, and from 2 to 30 parts by weight of a foaming agent:

(a) Gel fraction represented by the residue obtained by extracting with p-xylene at 120° C. for 24 hours, and then immediately drying at 80° C. and 10 mmHg for 24 hours is from 10% to 90%;

(b) Degree of swelling represented by the following equation (1) is not greater than 30:

$$\text{Degree of Swelling} = \frac{\text{Residue (g) shortly after 24 hours of Extraction with p-xylene at 120° C.}}{\text{Residue (g) obtained by extracting with p-xylene at 120° C. for 24 hours, and then immediately drying at 80 C. and 10 mmHg for 24 hours}} \quad (1)$$

and;

(c) When glass transition point determined from the temperature dependence of dynamic viscoelasticity is represented by the peak of tan δ determined by the measurement of dynamic viscoelasticity at a frequency of 10 Hz, there is observed no peak or one peak, if any, and the ratio α of storage modulus at 0° C. ($E'_0$) to storage modulus at 100° C. ($E'_{100}$) ($\alpha = \log E'_0/E'_{100}$) is from 10 to 30.

28. A polyolefin resin composition comprising 100 parts by weight of a polyolefin resin having a density of from 0.860 to 0.970 g/cm³ and a weight average molecular weight of 60,000 or more as determined by gel permeation chromatography and from 5 to 50 parts by weight of a low molecular polyolefin wax having a viscosity average molecular weight of from 1,500 to 10,000 as determined by a viscosity method and a melting point of from 100° C. to 160° C. as determined by DSC method.

29. The polyolefin resin composition according to claim 28, wherein said polyolefin resin is a straight-chain ethylene homopolymer or a straight-chain ethylene-α-olefin copolymer comprising ethylene and a $C_3$–$C_{12}$ α-olefin.

30. A polyolefin resin composition comprising 100 parts by weight of a straight-chain ethylene homopolymer or a straight-chain ethylene-α-olefin copolymer comprising ethylene and a $C_3$–$C_{12}$ α-olefin, having a density of from 0.860 to 0.970 g/cm³, a weight average molecular weight of 60,000 or more as determined by gel permeation chromatography, MFR of from 0.1 to 30 g/10 min at 190° C. and a load of 2,160 g, a melt tension of from 50 to 300 mN as determined when stretched at a draw ratio of 50 using a capillary rheometer having a die size L/D of 8/2.095 (mm) and a cylinder temperature of 160° C. and a non-linear parameter of 2 or more as an index of strain hardening of extensional viscosity, and from 5 to 50 parts by weight of a low molecular polyolefin wax having a viscosity average molecular weight of from 1,500 to 10,000 as determined by a viscosity method and a melting point of from 100° C. to 160° C. as determined by DSC method.

31. The polyolefin resin composition according to claim 28, wherein said low molecular polyolefin wax is a low molecular polyethylene wax.

32. The polyolefin resin composition according to claim 30, wherein said low molecular polyolefin wax is a low molecular polyethylene wax.

33. A foaming polyolefin resin composition comprising a polyolefin resin composition according to claim 28.

34. A foaming polyolefin resin composition comprising 100 parts by weight of a polyolefin resin composition according to claim 28 and from 2 to 30 parts by weight of a foaming agent.

35. A foaming polyolefin resin composition comprising 100 parts by weight of a polyolefin resin composition according to claim 30 and from 2 to 30 parts by weight of a foaming agent.

36. A foaming polyolefin resin composition comprising 100 parts by weight of a polyolefin resin composition according to claim 28, from 2 to 30 parts by weight of a foaming agent, and a crosslinking agent.

37. A foaming polyolefin resin composition comprising 100 parts by weight of a polyolefin resin composition according to claim 30, from 2 to 30 parts by weight of a foaming agent, and a crosslinking agent.

* * * * *